United States Patent [19]

Thomason et al.

[11] Patent Number: 5,359,705
[45] Date of Patent: Oct. 25, 1994

[54] METHOD OF DISPLAYING COMPOSITE SATELLITE IMAGERY

[75] Inventors: Larry W. Thomason, Poquoson, Va.; Robert P. d'Entremont, Roslindale, Mass.

[73] Assignee: The United States of America as represented by the Secretary of the Air Force, Washington, D.C.

[21] Appl. No.: 180,835

[22] Filed: Jan. 13, 1994

Related U.S. Application Data

[63] Continuation of Ser. No. 648,246, Jan. 31, 1991, abandoned.

[51] Int. Cl.⁵ .................................................. G06F 15/66
[52] U.S. Cl. .......................................... 395/131; 382/50
[58] Field of Search ............... 395/131, 132, 128, 129, 395/135, 138; 382/42–45, 48, 50, 51, 54, 56; 348/27, 33, 34

[56] References Cited

U.S. PATENT DOCUMENTS

| | | | |
|---|---|---|---|
| 4,567,515 | 1/1986 | Schumacher | 358/107 |
| 4,620,186 | 10/1986 | Krause et al. | 340/703 |
| 4,700,181 | 10/1987 | Maine et al. | 340/747 |
| 4,725,828 | 2/1988 | Cowlishaw | 340/703 |
| 4,857,992 | 8/1989 | Richards | 358/13 |

OTHER PUBLICATIONS

"Digital Image Processing"; Rafael C. Gonzalez, Second Edition, 1987; pp. 122–130 and 255–329.
"Fundamentals of Interactive Computer Graphics", J. D. Foley, 1984, pp. 129–135.

*Primary Examiner*—Mark K. Zimmerman
*Assistant Examiner*—Huynh Ba
*Attorney, Agent, or Firm*—Donald J. Singer; Stanton E. Collier

[57] ABSTRACT

The method of this invention simulates a 16-bit color composite satellite picture upon an 8-bit color display system, a simulated picture being of substantially equal quality as a 16-bit picture, a simulated picture can be placed on a personal computer system or workstation having an 8-bit color display system. The two 8-bit images for creating the 16-bit color picture are combined in a unique manner so that a resulting 8-bit color composite picture is presented on the 8-bit color display system. The 8-bit picture produced generally has greater contrast than the picture produced on the 16 bit system.

2 Claims, 1 Drawing Sheet

METHOD OF DISPLAYING COMPOSITE SATELLITE IMAGERY

STATEMENT OF GOVERNMENT INTEREST

The invention described herein may be manufactured and used by or for the Government for governmental purposes without the payment of any royalty thereon.

This application is a continuation, of application Ser. No. 07/648,246, filed Jan. 31, 1991 now abandoned.

BACKGROUND OF THE INVENTION

The present invention relates to a method of displaying composite satellite imagery, and, in particularly, to the display of such images on color display devices limited to 8 bits of color information per pixel.

Composite satellite imagery is the combination of coincident grayshade imagery into a single image in which color, as opposed to grayshade, is a reflection of radiant differences between the original images on a pixel-by-pixel basis. The use of composite imagery techniques can greatly increase the viewable information content of coincident satellite images and lends itself to easy interpretation by a scientist or trained operator. Standard approaches to composite image display require display devices that have a large addressable and viewable color space.

The standard method of generating composite imagery involves the use of display devices that are able to simultaneously display 16 or 24 bits of color. For 8-bit meteorological satellite images, a 16-bit system permits the combination of two images and a 24-bit system permits the combination of three images. The numerical value assigned to a composite image pixel is defined within a 32-bit longword 10 by setting the three lower order bytes, 12, 14 and 16 respectively, to the 8-bit values of the three images for that pixel, i, j, and k, respectively. The first byte 18 is designated as NULL since it is not used when there are three images. This is shown diagrammatically in FIG. 1. For a 16-bit system, either the value of the image byte 'k' is set to zero or a two byte word is used consisting of bytes i and j only.

A color lookup table is generated that defines the relationship between the numerical value assigned to a composite pixel and the displayed color of that pixel. It is defined such that the byte value from lowest order to highest defines the intensity of the primary colors red, green and blue, respectively, of the display device. For example when the value of the lowest order byte is zero the red intensity is at 0% and when the value is 255 the red intensity is at 100% of the device's capability. The mechanism by which the color lookup table is defined and loaded is highly hardware and software dependent.

In the resulting composite image, color as opposed to grayness denotes radiant differences (differences in pixel values) between the individual images. See d'Entremont et al., Interpreting Meteorological Satellite Images Using a Color Composite Technique, Bull. Amer. Meteor. Soc., Vol. 68, 1987, pp. 762–768, and d'Entremont et al., Color-composite Image Processing for Multispectral Meteorological Satellite Date, Proceedings of SPIE, October 1987, pp. 96–106 which are incorporated by reference. If the pixel values for each original grayshade image are the same, the composite pixel color is a shade of gray since the intensities of each primary color are equal. If the pixel values for each original image are different, the composite pixel will be a color other than gray, since the intensities of each primary color are unequal. With 256 intensities of red, green, and blue independently available for display the total number of colors available for simultaneous display is over 16 million on a 24-bit system and over 65 thousand on a 16-bit system. This large color space places virtually no restrictions on the quality of the colors in the composite image which exhibits smooth and natural looking color gradations. However, one of the greatest difficulties associated with the display of composite imagery is that 24-bit and 16-bit display devices are expensive and are not common among meteorological researchers and operational forecasting facilities.

Many color display devices, that are otherwise quite powerful, do not support either a 24 or 16-bit magnitude of depth of view in color. This is true of many of the workstations and personal computers used in research and operational environments. Like their 24-bit and 16-bit counterparts, 8-bit devices have a large collection of colors available for display but are only able to display 256 or 8 bits of color at any one time. Thus the present invention seeks to find a method of simulating 24-bit and 16-bit composite imagery on these 8-bit display devices.

SUMMARY OF THE INVENTION

The present invention is a method of providing a composite image for an 8-bit color display system.

This invention provides a pixel-value space transformation in which unused grayshade combinations from two 8-bit images are eliminated and the remaining "color space" is sub-divided into 256 bins. A single, unique grayshade value is assigned to each bin.

A lookup table is then constructed that gives the color for each 8-bit grayshade pixel value.

The color assigned to a particular bin is based upon the central value of the bin $i'_c$, $j'_c$ and color masks specified by the user in the utility that generates the bins and the associated lookup table. Through the color masks, the user defines the color such that pixels that exhibit positive radiant differences between image 1 and image 2 are revealed in the simulated composite image by a color shaded toward the primary mask (driven by image 1). On the other hand, negative radiant differences are revealed by a color shaded toward the secondary mask ( i.e., driven by image 2 ).

Thus the invention provides a method of producing an 8-bit composite image for an 8-bit color display device.

DESCRIPTION OF THE PREFERRED EMBODIMENT

The present invention provides a method of producing a single 8-bit composite image from two 8-bit satellite channels of different spectral information therein.

This 8-bit composite image is displayed on an 8-bit color display system of the present invention. The value of the present invention not only resides in the ability to use an 8-bit display system (as opposed to a more expensive and complex 16 or 24-bit system), but also in that the color picture produced appears to have better color contrast than the some times fuzzy nature of the 16-bit color image.

The present method facilitates the display and interpretation of composite satellite imagery on display devices with only 256 displayable colors. The technique is suitable for the combination of two 8-bit images into a single 8-bit composite image.

Figure 2:
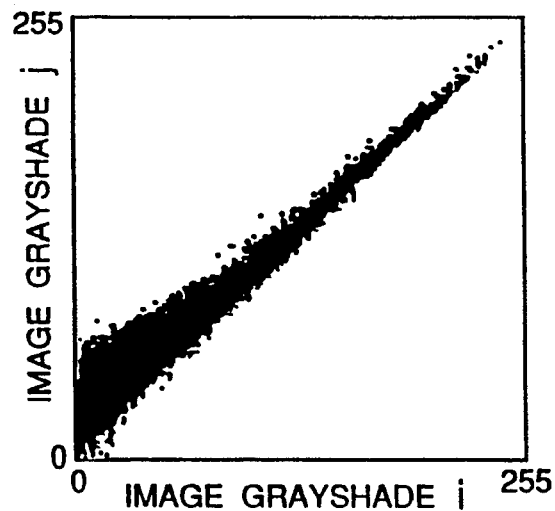
FIG. 2 illustrates by graph the occupied 8-bit grayshade space (i, j) for 2 images to be combined by the invention.

The transformation method is based on two characteristics common to most meteorological satellite images. The first is that for almost any combination of two coincident satellite images, the 2-dimensional pixel-value space (i, j) is mostly empty. In other words, for the pixels with a grayshade i in the first image, the range of corresponding pixel values j in the second image is small. The second characteristic is that a preponderance of the pixel value combinations lie near the line i=j and thus the primary image grayshades are nearly the same as that of the second image. Both of these characteristics are illustrated in FIG. 2. The dark and bright indicated on the i' axis refers to the relative intensity of the colorshade.

Figure 3:
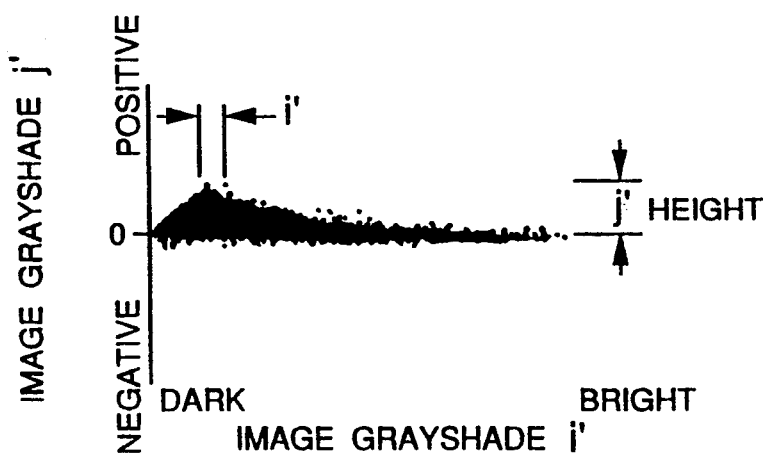
FIG. 3 illustrates by graph the transformed pixel value space (i'j') of FIG. 2.

The 2 dimensional frequency distribution as seen in, for example, FIG. 2, is computed by tabulating the number of occurrences of each pixel pair (i,j) in the original 8-bit images as seen, for example, in FIG. 2. See Table 2 for details. This 2-dimensional pixel-value space (i, j) is then transformed to (i', j') in which i' lies along the i=j line and j' is the normal to i', corresponding to an overall axial rotation of (i, j) space by 45 degrees. In the new space, the original pixel grayshade combinations have been altered by the relationship i'=i+j and j'=j−i. The value of i' is proportional to the mean intensity of the two images and j' is proportional to the difference in grayshades and thus also proportional to colorshade in the composite image. FIG. 3 shows the transformed pixel-value space plotted in FIG. 2. This color system is somewhat analogous to the HLS color system, where i' corresponds to lightness and j' corresponds to saturation. However, it should be pointed out that the HLS system is in no way in and of itself a substitute for the invention described herein because the HLS system uses 24 bits for color display just as the 24 bit R/G/B systems.

Figure 1:
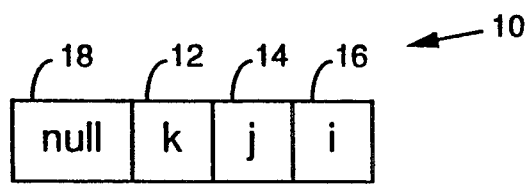
FIG. 1 is a diagram of a typical longword of a three-image composite pixel.
Figure 4:
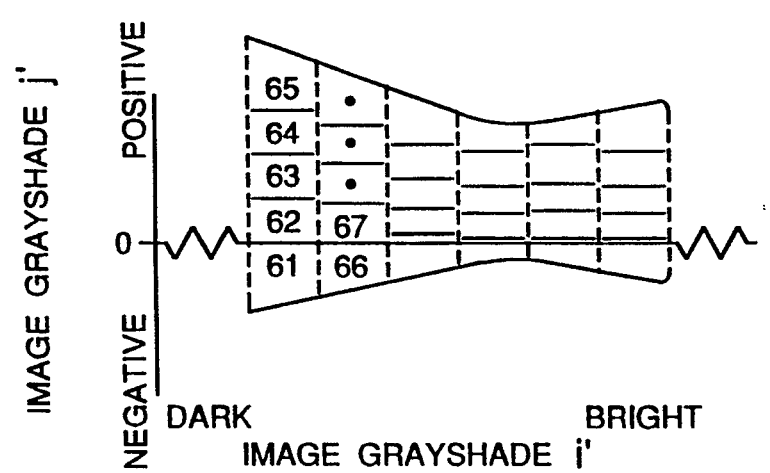
FIG. 4 illustrates by graph a subset of the 255 color bins derived from FIG. 3 by the method of the invention.

Through the described invention the intensity axis i', whose domain extends from 0 to 510, is divided into 51 columns, each of 10 units width. This division into 51 grayshades is sufficient to provide smooth, noise-free, easily interpretable grayshade images, nearly indistinguishable from an 8-bit or 256-grayshade image. The upper and lower bounds of each column are obtained from observing the limits of the transformed frequency distribution, FIGS. 3 and 4. See also Table 2 for details. The domain of j' is dependent on i' but has a maximum extent of −255 to +255 (though in actuality the occupied height of a column is typically much smaller). Each column is individually divided into 5 equal-height bins which span the full range of j' observed within that i' column. A typical grayshade range for individual bin heights is from 5 to 20. The entire occupied (i',') pixel-value space has been encompassed by 255 (55×5) bins of i' and j', a section of which is shown in FIG. 4. There are conditions under which the transformation approach does not work as well, in particular, when the images to be combined exhibit a high contrast (i.e., large j') with one another. Such an example would be characterized by a larger spread of dots in FIG. 1, corresponding to vastly different coincident grayshade values within the 2 original images.

The color assigned to each of the 255 bins is based upon the central value $(i'_c, j'_c)$ of each bin and the color masks specified by the user. Through the color masks, the user defines the color such that pixels exhibiting positive radiant differences between image 1 and image 2 are revealed in the simulated composite image by a color shaded toward the primary mask. Similarly, negative radiant differences are revealed by a color shaded toward the secondary mask. For instance, for a primary mask of "RED" and a secondary mask of "BLUE," a pixel ,, value of i'=249 and j'=12 will yield a slightly reddish gray. If, however, j' was equal to −12 then the pixel would exhibit a bluish tint. Table 1 lists the valid combinations of primary colors and their net mask color.

TABLE 1

| COLOR COMBINATIONS AVAILABLE | |
|---|---|
| Color Masks | |
| Primary Colors | Resultant Color |
| Red | Red |
| Blue | Blue |
| Green | Green |
| Red + Blue | Magenta |
| Red + Green | Yellow |
| Blue + Green | Cyan |

The intensities of the primary colors red, green and blue for a particular color bin with center $(i'_c, j'_c)$ are given by the following equations:

$$P = \frac{100(i_c' - j_c')}{510}$$

$$S = \frac{100(i_c' + j_c')}{510}$$

$$E = \frac{100\, i_c''}{510}$$

where P includes all the primary colors included in the primary mask, S includes all the primary colors included in the secondary mask, and E includes any primary colors excluded from either mask. Primary colors that are a part of the primary mask cannot be a part of the secondary mask. The colors associated with the 255 pixel-value bins are loaded into the color display device's color lookup table with entry numbers such as those shown in FIG. 4.

The simulated composite image grayshade array is generated by assigning to each pixel within the color image the lookup table entry number that corresponds to the bin in which the associated values of i' and j' locate it. After downloading the color lookup table the image (i', j') may then be displayed on the 8-bit color display device by simply loading the image. A computer program for providing the 8-bit composite image is shown in Table 2.

Clearly, many modifications and variations of the present invention are possible in light of the above teachings and it is therefore understood that, within the inventive scope of the inventive concept, the invention may be practiced otherwise than specifically claimed.

TABLE 2

| | |
|---|---|
| Function: | Combine 2 8-bit images into a single composite image including the associated look up table. |
| Authors: | Larry W. Thomason and Robert P. d'Entremont<br>Geophysics Laboratory (AFSC)<br>GL/LYS<br>Hanscom AFB, MA 01731-5000<br>USA<br>Ph. (617)-377-3317 or (617)-377-2983<br>AV: 478-3317 or 478-2983 |
| Description: | This utility determines the lookup table and image values of a simulated two-channel color composite image using a coordinate transform and binning to restrict the pixel value space. |
| Calling Arguments: | |
| Image_1: | A read/write byte array which on entrance contains the grayshade values for the first image. Since it is also used as a work space, data in the array is lost on return. |
| Image_2: | A read/write byte array which on entrance contains the grayshade values for the second image. Since it is also used as a work space, data in the array is lost on return. |
| Image-3: | A write-only byte array in which the grayshade values for the composite image are returned. The array is nearly uninterpretable without the Corresponding lookup table (Arg. IVVLT). |
| Cols: | The number of columns in the image arrays. Note that all three arrays MUST be of the same dimension. |
| Rows: | The number of rows in the image arrays. |
| IVVLT: | An I*4 array containing the 256 lookup table entries for the composite color image. |
| Mask_1: | A longword containing, effectively, the color(s) to be driven by Image_1. It can be the sum of 1, 2 or 3 of the following BLUE (1), GREEN (256) and RED (65536). Thus for Image_1 driving both Green and Blue, Mask_1 would be GREEN + BLUE or 257. |
| Mask_2: | A longword containing, effectively, the color(s) to be driven by Image_2. It can be the sum of 1, 2 or 3 of the following BLUE (1), GREEN (256) and RED (65536). Generally, Mask_2 should be disjoint with Mask_1 and it should definitely be different than Mask_1. |

CID_Displacement Functional Return Codes:
 1 - Success
 2 - Failed, Image colors masks are not disjoint.
 4 - Failed, Color mask 1 value is illegal.
 6 - Failed, Color maks 2 value is illegal.

```
      Integer*4 Function CID_Displacement ( Image_1, Image_2, Image_3,
    +                                      Cols, Rows, IVVLT, Mask_1, Mask_2 )
        Integer*4  IVVLT(256),              !The Derived Lookup Tables
    +              Histogram(-127:127,0:50), !Histogram of pixel value density i' vs j'
    +              Width(0:50),             !Width of the saturation bins as function of intensity columns
    +              ich_1,                   !Image 1 dummy variable, associated with byte array Bch_1
    +              ich_2,                   !Image 2 dummy variable, associated with byte array Bch_2
    +              Icol,                    !Color intesity of the primary image
    +              Ired,                    !Color intensity of the secondary image
    +              itemp,                   !dummy variable, associated with byte array Btemp
    +              JpMax(0:50),             !Maximum value of j' as function of i'
    +              JpMin(0:50),             !Minimum value of j' as function of j'
    +              Rows,                    !Number of rows in images
    +              Cols,                    !Number of columns in images
    +              Mask_1,                  ! Color mask of primary image (crude HUE control)
    +              Mask_2                   !Color mask of secondary image (Crude HUE control)
        Byte  Image_1(Cols,Rows),           !Array containing Image 1 pixel values, destroyed during processing
    +         Image_2(Cols,Rows),           !Array containing Image 2 pixel values, destroyed during processing
    +         Image_3(Cols,Rows)            !Array containing Image 3 pixel values, created during processing
        Byte bch_1(4), Bch_2(4), BTemp(4)   !Byte arrays used during processing associated with above i*4s
        Equivalence (Bch_1,ich_1),(Bch_2,ich_2),(Btemp,Itemp)
  Ramtek RGB LUT offsets for Red, Green, and Blue
        PARAMETER BLUE    = 1          ! 2 ** 0
        PARAMETER GREEN   = 256        ! 2 ** 8
        PARAMETER RED     = 256*256    ! 2 ** 16
  Initialize the Histogram Array
        Do j = 0, 50, 1
           Do k = -127, 127, 1
              Histogram(k,j) = 0
           End Do
        End Do
  Check the Masks to be sure they are valid
  Masks must be combinations of RED, GREEN, and BLUE only
        If((Mask_1.And.'00010101'X).Ne.Mask_1) Then
```

TABLE 2-continued

```
            CID_Bin_Rotate = 4
            Return
Masks must be combinations of RED, GREEN, and BLUE only
        Else If((Mask_2.And.'00010101'X).Ne.Mask_2) Then
            CID_Bin_Rotate = 6
            Return
Masks must be disjoint
        Else IF((Mask_1.And_Mask_2).Ne.0) Then
            CID_Bin_Rotate = 2
            Return
Masks will be initialized if both are zero
        Else If(Mask_1.Eq.0.And.Mask_2.Eq.0) Then
            Mask_1 = GREEN + BLUE
            Mask_2 = RED
        End If
Transform the image arrays into i' (i+j or intensity) and j' (j−i or
saturation) coordinates and construct the frequency of occurence histogram
for i' and j'. Here, i is the observed Image_1 pixel value and j is the
observed Image_2 pixel value.
        Do J = 1, Rows
            Do k = 1, Cols
                Bch_2(1) = Image_2(k,j)
                Bch_1(1) = Image_1(k,j)
Scale i' to from 0 to 50 rather than from 0 to 510. Values of 510 are
dropped into the 50 column.
                Itemp = (Ich_1 + Ich_2)/10
                Image_1(k,j) = Btemp(1)
                If(Itemp.Gt.50) Image_1(k,j) = 50
                If(Itemp.Lt.0) Image_1(k,j) = 0
Restrict j' to exist between −127 and 127 rather than from −255 to 255.
This is almost never a problem except when combining VERY diverse types
of imagery such as visible and microwave in which differences for
corresponding pixel values can be very large.
                Itemp = Ich_2 − Ich_1
                Image_2(k,j) = Btemp(1)
                If(Itemp.Gt.127) Image_2(k,j) = 127
                If(Itemp.Lt.−127) Image_2(k,j) = −127
                Itemp = 0
Increment the histogram frequency distribution for the observed i', j'
pair.
                Histogram(Image_2(k,j),Image_1(k,j)) =
        +           Histogram(Image_2(k,j),Image_1(k,j)) + 1
            End Do
        End Do
Determine the upper and lower limits of j' (ch2-ch1) as a function of
intensity, i'.
        Do Index = 0, 50
Look for the lower limit of j' for the current value of i' (intensity), but
to until at least 50 pixels have been recorded in order to avoid image noise,
etc.
            Sum = 0
            I = −127
            Do While(Sum.Lt.50.And.I.Lt.0)
                Sum = Sum + Histogram(I,Index)
                I = I + 1
            End Do
            JpMin(Index) = I
Look for the upper limit j' for the current value of i' (intensity), but to
until at least 50 pixels have been recorded in order to avoid image noise,
etc.
            Sum = 0
            I = 127
            Do While (Sum.Le.50.And.I.Gt.0)
                Sum = Sum + Histogram(I,Index)
                I = I − 1
            End Do
            JpMax(Index) = I
Determine the j' bin widths and set to be no less than 1 for any value of
i'. It can be very narrow (including 0) especially at the extremes of the
pixel space (around 0 and 255).
                Width(Index) = (JpMax(Index) − JpMin(Index))/5
                If(Width(Index).Lt.1) Width(Index) = 1
        End Do
Determine the composite 'binned' lookup table for the (i',j') image.
In this section the image lookup table is generated. The assigned color is
a grayshade proportional to i' (intensity) and displaced either toward the
Mask_1 color (if j' is negative) or the Mask_2 color (if j' is positive) by
an amount proportional to j'. Some resoultion is lost since bin widths
average around 15 on an 8-bit scale.
        Do j = 0, 50
            Do n = 0, 4
                IDisplace = JpMin(j) + ((2*n+1)*Width(j))/2
```

TABLE 2-continued

```
If the displacement is positive, increase the Mask__2 color intensity
            If(Idisplace.Gt.0) Then
                ICol = j*5
                IRed = Icol + IDisplace
If the displacement is negative, increase the Mask__1 color intensity
            Else
                IRed = j*5
                ICol = Ired - IDisplace
            End If
Be certain that the LUT color intensties do not exceed bounds 0-255.
            If(Ired.Lt.0) Ired = 0
            If(Icol.Lt.0) Icol = 0
            If(Ired.Gt.255) Ired = 255
            If(Icol.Gt.255) Icol = 255
Add the color to the lookup table
            ivvlt(j*5+n+1)=Mask__2*Ired + Mask__1*Icol
        End Do
    End Do
This color is not really used but, for completeness' sake, set to full
white.
        ivvlt(256) = (Mask__2 + Mask__1)*255
Load the imagery array 3 (IMAGE__3) with the LUT numbers associated with the
pixel grayshade bin indicated by the values of the two primary images.
LUT # = i'*5 + (j' - JpMin(i'))/Width(i')
        Do k = 1, Rows
            Do l = 1, Cols
                Itemp = 0
                Compute the composite "intensity" i' for the pixel
                    BTemp(1) = Image__1(l,k)
                    Ip = Itemp*5
                Compute the Composite "saturation" j' for the pixel
                    Index = Itemp
                    Jtemp = Image__2(l,k)
                    Jp = (Jtemp-JpMin(Index))/Width(Index)
                Do a bounds check on the saturation (0-4)
                    If(Jp.Gt.4) Jp = 4
                    If(Jp.Lt.0) Jp = 0
                Compute the composite lookup table value for the pixel
                    Itemp = Ip + Jp
                    Image__3(l,k) = Btemp(1)
            End Do
        End Do
Return a success code, as ususal in VMS, a 1.
        CID__Bin__Rotate = 1
Return to sender, address known(?) (ed. note, A bad American joke)
        Return
        End
                                                    END OF TABLE 2.
```

What is claimed is:

1. A method for simulating a 16-bit color composite satellite picture upon an 8-bit color display system, the resultant simulated color being of almost equal picture quality as a 16-bit picture, said method comprising the steps of:

(a) inputting said two 8-bit image arrays into a computer;

(b) setting selected primary and secondary color masks for each of said input image arrays;

(c) transforming said two input image arrays, each of said array being an entire picture, by means of equation $i'=i+j$ and $j'=j-i$ wherein i and j are corresponding pixel values of said input image arrays at a given pixel location;

(d) determining a frequency of occurrence for each $(i', j')$ pixel value pair formed by said transforming;

(e) dividing the i' axis into a predetermined number of columns;

(f) determining an upper and lower limits of j' as a function of i' for each column;

(g) determining the j' height for an i' column to generate a plurality of bins for establishing a color to be displayed for that bin, said bins being less than or equal to 256 in number;

(h) generating a color lookup table for each of the bins based upon the selected primary and secondary color masks;

(i) generating an 8-bit color composite image array;

(j) inputting said color lookup table and said 8-bit color composite image array into said 8-bit color display system; and (k) displaying said simulated color picture by the 8-bit color display system.

2. A method as defined in claim 1 wherein steps b to j are performed by said computer.

* * * * *